F. M. FURBER.
LUBRICATING DEVICE.
APPLICATION FILED OCT. 25, 1918.
1,410,096.
Patented Mar. 21, 1922.
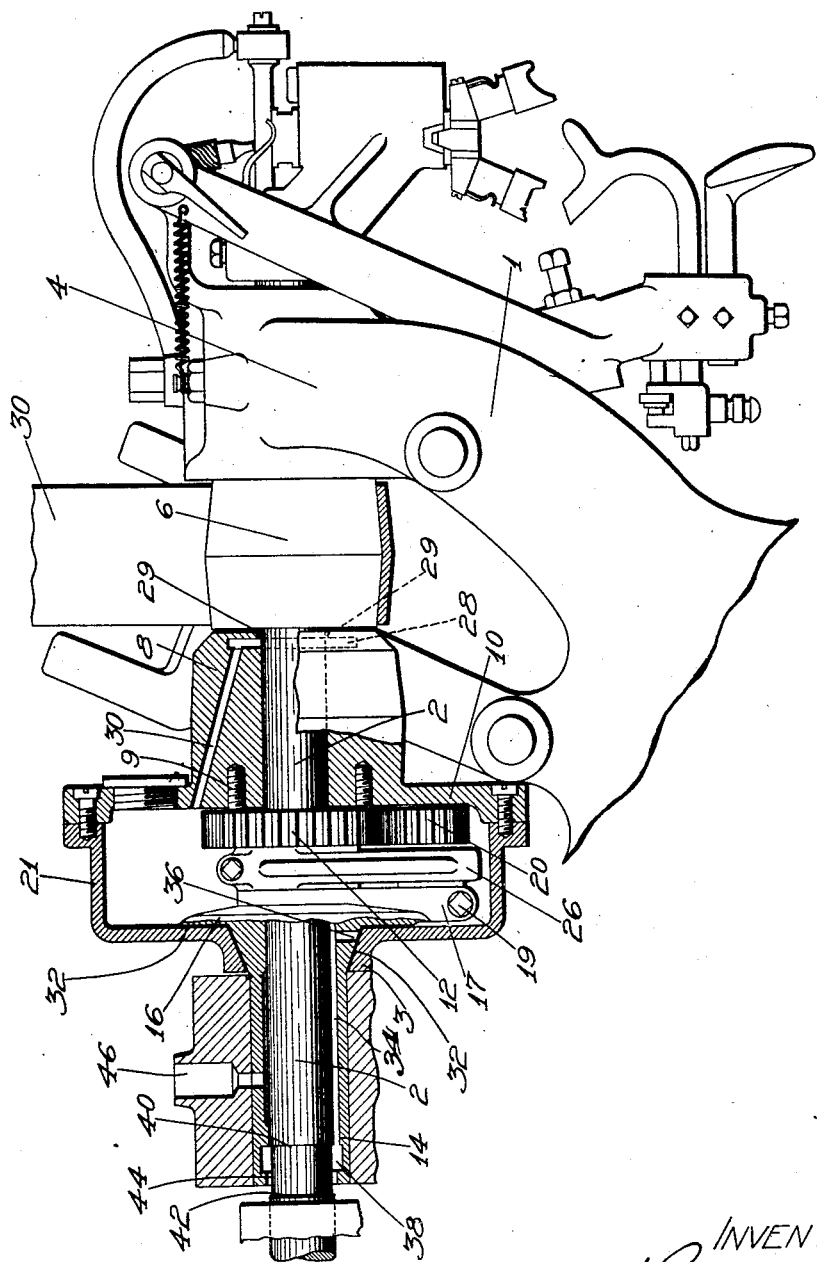
INVENTOR-
Frederick M Furber

UNITED STATES PATENT OFFICE.

FREDERICK M. FURBER, OF REVERE, MASSACHUSETTS, ASSIGNOR TO UNITED SHOE MACHINERY CORPORATION, OF PATERSON, NEW JERSEY, A CORPORATION OF NEW JERSEY.

LUBRICATING DEVICE.

1,410,096.

Specification of Letters Patent.   Patented Mar. 21, 1922.

Application filed October 25, 1918. Serial No. 259,630.

*To all whom it may concern:*

Be it known that I, FREDERICK M. FURBER, a citizen of the United States, residing at Revere, in the county of Suffolk and State of Massachusetts, have invented certain Improvements in Lubricating Devices, of which the following description, in connection with the accompanying drawings, is a specification, like reference characters on the drawings indicating like parts in the several figures.

This invention relates to lubrication, and is herein described by way of example as embodied in a machine for burnishing the sole edges of boots and shoes. The invention is particularly directed to the prevention of leakage of oil from oil reservoirs or casings, and resides in certain novel arrangements and combinations of parts explained in the following specification with reference to the accompanying drawing which shows a sectional view of the head of an edge setting machine.

The shaft 2 oscillates in bearings sustained by the machine frame 1, one of said bearings being referred to by the numeral 4. The shaft 2 carries two loose pulleys 6, 8, the former being an idler and the latter having a flange 10, and being secured by suitable means, as screws 9, to a gear 12 which rotates on the shaft 2 with the pulley. A bushing 14, which is fixed in the frame, surrounds the shaft 2, the bushing having a flange 16 whose outer face is adjacent to the inner wall of a drum or casing 21, the open end of which is secured to and closed by the flange 10. The flange 16 of the bushing has an extension 17 provided with a split bearing within which is clamped a stud by a screw 19. On this stud is rotatably mounted a gear 20 meshing with the gear 12. The gear 20 has an eccentric which is secured rigidly thereon and lies between said gear and the extension 17. The eccentric seats in a rectangular block which is embraced by a fork 26, the latter being secured rigidly to the shaft 2.

The block slides in the fork as in a guideway and serves to transmit the movements of the eccentric to the fork in the form of oscillations, which movements are in turn applied to the tool-carrying shaft 2. As the gear 12 is rotated by the pulley 8, the rotatory movement of the latter is, through the described connections, converted into oscillating motion of the shaft 2. The gear ratio between the gears 12 and 20 is, in the example illustrated, 2–1, so that for each rotation of the pulley, four oscillatory movements are imparted to the tool carrying shaft, and the vibrations of the burnishing tool are accordingly twice as many as would be the case if the stud shaft were rotated once for each rotation of the pulley 8. This mechanism is more fully described and claimed in my co-pending application Ser. No. 247,215, and need not be further discussed here.

The means for transmitting movement between the driving member, or pulley 8, and the driven member, or shaft 2, and which comprises the gears 12 and 20, the eccentric and other connections, are all enclosed by the casing 21 and run in oil in said casing. This insures complete lubrication of the essential working parts, and by minimizing friction keeps them in good running condition, and increases their durability.

There are three places in the above described mechanism at which the danger of oil leakage from the casing or drum needs to be guarded against. These are between the shaft 2 and the pulley 8, between the flange 16 and the casing 21, and between the shaft 2 and the bearing 14. These places I have guarded as follows:—

An annular channel 28 is formed preferably near the outside face of the pulley 8, surrounding the bore. From the bottom of this channel a second channel 30 leads away from the axis of rotation, and inwardly to the interior of the casing 21. Any oil seeping through along the shaft 2 is thus thrown to the bottom of the channel 28 by the centrifugal action due to the rotating pulley and is then, by the same agency, returned to the drum 21. There is a clearance 29 between the pulley and the shaft outside the channel 28 to avoid collection of oil at this point.

Leakage between the drum 21 and the flange 16 is avoided by leaving a substantial space 32 between the casing and the flange. I have found that this space, though of capillary dimensions, needs to be considerably larger than that necessary to make a machine fit, the clearance being between .005 and .015 inch for the best results with the oil used by me. An oil film of substantial thickness can thus find room between the casing and the flange 16, and will be dragged around by the rotation of the casing. A centrifugal action thus developed will throw it back into the drum. The surface tension effect will be substantially the same irrespective of the thickness of the film, and I have found that the thickness described will make the film heavy enough to overcome the surface tension effect, which tends to hold the oil in the space 32.

In order to avoid leakage at the third point mentioned, I form a channel 34 along the interior of the bearing 14 under the shaft 2, its inner end being connected to the space 32 by the passage 36. The outer end of the channel 34 connects with an annular channel 38 in the bearing 14 near its end, surrounding the bore. A reduction in diameter of the shaft, forming two shoulders 40, 42 is made at this point, the reduction extending outside the bearing. A clearance 44 exists between the end of the bearing and the shaft so that no oil can collect there.

I have found that there is an action positively tending to draw oil inward along the channel 34, so strong that I can fill the drum 21 with oil by flooding the oil cup 46 without the appearance of oil beyond the end of the bearing. The centrifugal action in the space 32 appears to set up an actual pumping action. This action is rendered more efficient by the fact that the shaft oscillates but does not rotate, and that consequently the tendency to throw oil outwardly from the axis of rotation is small. I have found that no oil ever reaches the shoulder 42, all oil which passes the shoulder 40 being drawn into the channel 34. The sharp corner between the shoulder 40 and the reduced portion of the shaft tends to hold the oil which seeps out over the shoulder, and prevents it from working out along the shaft toward the shoulder 42. This embodies an important feature of the invention. The matter of surface tension probably plays an important part in this action. The action here is independent of the means adopted for causing the oil to tend to move along the channel 34. A steep gradient would cause the oil collecting and flowing down in the corner at 40 to flow away.

I regard the space 32 by which this pumping action is created as an important feature of the invention. Any rise in pressure in the drum is prevented by free access to the outside air through the channel 30. It is probable also that bubbles of air work back through the body of oil in the space 32. This would naturally be somewhat frothy and the heavy oil would tend to fly into the drum while the air could work back toward the outer air.

Having described my invention, what I claim as new and desire to secure by Letters Patent of the United States is:—

1. In a device of the class described, a shaft and a casing rotatably mounted on the shaft and arranged to contain oil for lubricating gearing in the casing, the casing wall containing an annular cavity surrounding the shaft and a channel leading from the bottom of said cavity away from the shaft into the interior of the casing.

2. In a device of the class described, a shaft and a casing rotatably mounted on the shaft and arranged to contain oil for lubricating gearing in the casing, the casing wall containing an annular cavity surrounding the shaft and a channel leading from the bottom of said cavity away from the shaft into the interior of the casing, there being a clearance of more than capillary dimensions between the shaft and that part of the casing wall lying outside the cavity.

3. In a device of the class described, a support, a casing rotatably mounted thereon and arranged to contain oil for lubricating gearing in the casing, an extension on the support within the casing extending away from the axis of rotation and parallel to the adjacent wall of the casing at a distance therefrom of capillary dimensions but substantially greater than that necessary to form a machine fit, whereby a film of oil of substantial thickness will be dragged circumferentially by the rotation of the casing.

4. In a device of the class described, a support, a casing rotatably mounted thereon and arranged to contain oil for lubricating gearing in the casing, an extension on the support within the casing extending away from the axis of rotation and parallel to the adjacent wall of the casing at a distance therefrom of capillary dimensions but substantially greater than that necessary to form a machine fit, whereby a film of oil of substantial thickness will be dragged circumferentially by the rotation of the casing, the casing having a passage through which free access to the outer air is established.

5. In a device of the class described, a support, a casing rotatably mounted thereon and arranged to contain oil for lubricating gearing in the casing, the casing having an opening surrounding the axis of rotation, and a member mounted within the casing, but not rotating with it and extending parallel to the casing wall in a direction transverse to the axis of rotation around the opening and separated from the wall by a distance of capillary dimensions but not necessarily as small as is required for a machine fit.

6. In a device of the class described, a rotating casing arranged to contain oil for lubricating mechanism contained therein, the casing having a hole in its wall, a member extending through the hole and means for preventing seepage of oil along the member through the hole, comprising a fixed element within the casing extending parallel to the casing wall around the hole transverse to the axis of rotation and separated therefrom by a space of capillary dimensions but larger than that required for a machine fit, the said space being connected with the joint between the wall and the member.

7. In a device of the class described, a rotating casing, a shaft not rotating with the casing and extending through its wall to its interior, a bearing for the shaft extending to the casing wall, and means for preventing seepage of oil between the shaft and the bearing comprising a groove in the bearing along the bottom of the shaft and a stationary member extending transverse to the axis of rotation of the casing and parallel to the casing wall and separated therefrom by a space of capillary dimensions but larger than that required for a machine fit, said space being connected with said groove.

8. In a device of the class described, a rotating casing arranged to contain oil for lubricating gearing in the casing, a non-rotating shaft extending into the casing and around which the casing rotates, and means for preventing seepage of oil from the casing along the shaft comprising a bearing for the shaft extending up to the casing wall, a channel below the shaft between the shaft and bearing, an annular clearance at the outside end of the bearing between the shaft and bearing into which the channel opens, and a member within the casing, extending parallel to the casing wall and transverse to the axis of rotation, and separated therefrom by a space of capillary dimensions but greater than required for a machine fit, the channel being connected to said space.

9. In a device of the class described, a shaft, a bearing for the shaft, and means for preventing seepage of oil comprising an annular reduction in the shaft having a sharp concavity, a channel for conveying the oil from the reduction, and means for reducing below atmospheric value the pressure at a point in the channel remote from the concavity.

10. In a device of the class described, a shaft, a bearing for the shaft, and means for preventing seepage of oil comprising an annular reduction in the shaft at the end of the bearing having a sharp concavity, a channel for conveying the oil from the reduction extending between the shaft and the bearing, and means for setting up a pumping action in the channel.

11. In a device of the class described, a shaft, a bearing for the shaft, and means for preventing seepage of oil comprising an annular reduction in the shaft having a sharp concavity, and a channel in the bearing surface for conveying the oil from the reduction.

12. In a device of the class described, a shaft, a bearing for the shaft, and means for preventing seepage of oil comprising an annular reduction in the shaft having a sharp concavity, and a channel between the shaft and the bearing for conveying the oil from the reduction.

In testimony whereof I have signed my name to this specification.

FREDERICK M. FURBER.